UNITED STATES PATENT OFFICE.

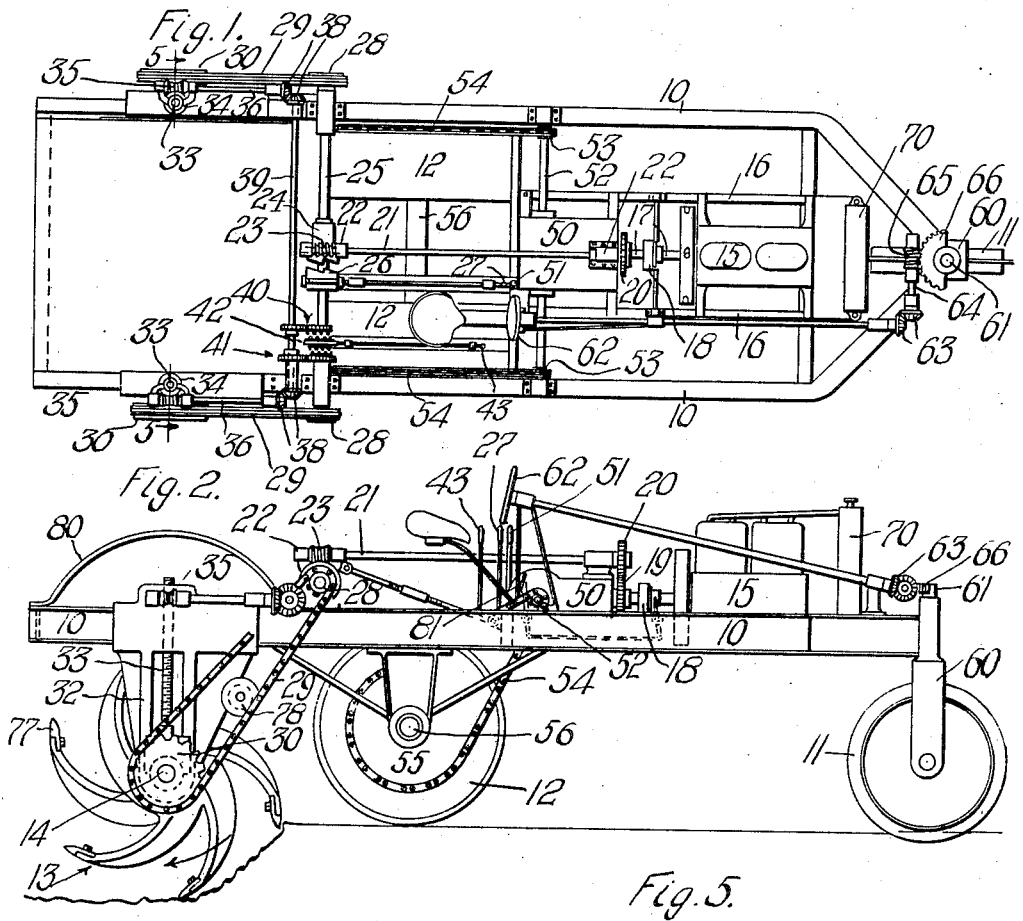

ANDREW J. AUTRY, OF LOMITA, CALIFORNIA.

TRACTOR-SUBSOILER.

1,203,091.  Specification of Letters Patent.  Patented Oct. 31, 1916.

Application filed February 14, 1916. Serial No. 78,141.

*To all whom it may concern:*

Be it known that I, ANDREW J. AUTRY, a citizen of the United States, residing at Lomita, in the county of Los Angeles, State of California, have invented new and useful Improvements in Tractor-Subsoilers, of which the following is a specification.

This invention relates to a tractor plowing device; and it is the object of this invention to provide a simple and strong tractor plow which will efficiently and thoroughly disturb, plow or cultivate the soil, and be of easy and simple operation.

The further objects of this invention appear in the following specification, reference being had to the accompanying drawings in which I have illustrated a preferred form of my invention.

In these drawings Figure 1 is a plan of my improved tractor plow, Fig. 2 is a side elevation of the same, Fig. 3 is a detail showing the construction of the plow members, Fig. 4 is a detail section taken on line 4—4 of Fig. 3, and Fig. 5 is a section taken as indicated by line 5—5 on Fig. 1.

In the drawings I have shown a suitable frame 10 constructed of structural steel in the configuration shown, being of such shape and arrangement as to carry a forward steering wheel 10 and the two rear driving wheels 12 in the position illustrated. The frame extends rearwardly of the driving wheels and carries the plow members 13 mounted upon a horizontal shaft 14 which is vertically adjustable.

A motor 15 of suitable design and power is mounted upon a sub-frame 16 as shown; and the shaft 17 from this motor is provided with a suitable clutch 18 operated by foot pedal 81 so that the motor may be freed from the other mechanism when desired. A gear 19 is mounted on the motor shaft rearwardly of the clutch and this gear drives another gear 20 on a shaft 21 mounted in bearings of 22. Shaft 21 has at its rear end a worm 23 meshing with a worm wheel 24 on the transverse shaft 25. Worm wheel 24 is loose on shaft 25 and can be rotatively connected with the shaft by a clutch 26 operated by lever 27. Sprocket wheels 28 are mounted on the outer ends of the shaft 25; and drive chains 29 connect sprocket wheels 28 with sprocket wheels 30 mounted upon the outer ends of the plow shaft 14. Plow shaft 14 is journaled in blocks 31 movable vertically in ways 32. Blocks 31 are supported and held in position by the screw thread rods 33; rear rods are operated vertically by the rotation of worm wheels 34. The worm wheels 34 are operated by worms 35 on shafts 36; and at the forward ends of these shafts beveled gears 37 mesh with beveled gears 38 on a transverse shaft 39. Shaft 39 is driven from transverse drive shaft 25 through the medium of two sets of gears 40 and 41. These gear sets are arranged so as to drive the shaft 39 in opposite directions upon throwing clutch 42 to opposite positions. This clutch is actuated by lever 43. By throwing the lever 43 the blocks 31 may be raised or lowered as desired, raising or lowering the plow members on the shaft 14, either to vary the depth of soil disturbance or to raise the plows completely clear of the surface when the tractor is traveling from place to place. A shield 80 covers the plows to prevent accident.

The shaft 17 behind clutch 18 runs directly into the transmission mechanism 50; and this transmission is designed to give a number of different speeds forward (and a rear speed if desired), the transmission gears being shifted by shifting lever 51. The transverse shaft 52 is driven by the transmission; and this shaft carries sprocket wheels 53, driving chains 54, driving sprockets 55 on the main propulsion shaft 56 carrying wheels 12. The forward steering wheel 11 is carried in a forked frame 60 mounted upon steering post 61. A hand wheel 62 connects through gears 63 with a transverse steering shaft 64 having a worm 65 meshing with worm wheel sector 66 on steering post 61. The engine is provided with the usual radiator 70.

My preferred form of plow or other soil distributing member is particularly shown in Fig. 3. It comprises a central hub 75 adapted to be keyed to the shaft 14, and having a plurality of, preferably three, spirally projecting arms 76, preferably of diamond shaped cross-section so as to readily part the soil. At the ends of these spiral arms I provide removable shoes 77, the configuration of which will vary with the character of work to be accomplished. As herein before stated, the plow members may be raised or lowered as desired, so as to vary the depth of soil disturbance; and idler wheels 78 are placed so as to keep chains 29 at a working degree of tightness regardless of the position of shaft 14.

It will be seen that the plow members are continuously driven at a uniform speed; and that the speed of the plows is not varied by shifting the transmission gears. Shifting the transmission gears changes the speed of travel of the tractor; but in any case the plows travel faster than the tractor. That is, the plows travel at such a speed that, when the whole device is moving over the ground, the plow points will move rearwardly through the ground, the points moving rearwardly faster than the tractor moves forward. This is the case even when the tractor is traveling at its highest speed forward. (It will be noted that the spiral plow arms may be turned and revolved in either direction; that is the plow arms may be turned around in the direction opposite to that shown, and the rotation may be opposite to that indicated). The speed at which the tractor travels will depend upon the nature of the soil and the character of the plowing or cultivating desired. If the soil is heavy and hard to work, or if it is desired to break the soil up very finely, the transmission will be thrown into a low speed so that the tractor travels slowly. If, on the other hand, the soil is easily worked, or it is desired to only break it coarsely, the tractor may then travel at a higher speed. For instance, the speeds of travel of the tractor may be one, two and three miles per hour, while the peripheral speed of the plow arms may be much greater than the highest speed of travel.

The width of each plow, the spacing of the plows along the shaft 14, and the number of arms or teeth on each plow, all depend upon the circumstances of the actual work in hand. In average work I prefer to make the plows of the relative size shown, spaced closely on the shaft 14, with the arms of adjacent members staggered. This arrangement produces a good continuous action on the soil.

I claim—

1. In a tractor plow, a frame, supporting and driving wheels therefor, a motor on the frame operatively connected with the driving wheels to drive the frame, a rotary plow arranged on a horizontal shaft on the frame, vertically adjustable bearings for said plow shaft, a motor shaft, a transverse shaft driven from said motor shaft, driving means between the transverse shaft and the plow shaft, the arrangement being such that the plow shaft is driven at a constant speed from the motor, driving means for the frame embodying a change speed transmission, the arrangement being such that the plow speed is at all times greater than the frame speed, and means to raise and lower the plow shaft embodying a transverse shaft, means to drive said transverse shaft in either direction from said first mentioned transverse shaft, a pair of vertical screws attached at their lower ends to the plow shaft bearings, worm wheels internally threaded and coöperating with said screws, and worms meshing with said worm wheels and driven from said second mentioned transverse shaft.

2. In a tractor plow, a frame, supporting and driving wheels therefor, a motor on the frame, connective means between the motor and the driving wheels including a change speed transmission device to cause the frame to be propelled at different speeds, a pair of vertical ways on opposite sides of the frame rear of the driving wheels, journal boxes carried and movable in said ways, a horizontal plow shaft carried in said journal boxes, a plurality of soil plowing members on said shaft between said journal boxes, a transverse plow driving shaft on the frame, driving connection between the motor and the said transverse shaft, and driving connection including drive chains between the ends of the transverse shaft and the ends of the plow shaft, the plow shaft being driven from the motor at a uniform speed such that the peripheral travel of the plow members is at a greater speed than that of the driving wheels and greater than the speed of propulsion of the frame over the ground, and means to raise and lower the plow shaft, embodying another transverse shaft on the frame, means to drive said last mentioned transverse shaft in either direction at will from the first mentioned transverse shaft, vertical screw-threaded rods secured at their lower ends to said journal boxes, internally threaded worm wheels engaging the upper ends of said rods, longitudinal shafts having worms meshing with said worm wheels and gearing connection between said shafts and said second mentioned transverse shaft.

3. In a tractor plow, a frame, supporting and driving wheels therefor, a motor on the frame operatively connected with the driving wheels to drive the frame, a rotary plow arranged on a horizontal shaft on the frame, vertically adjustable bearings for said plow shaft, a motor shaft, a transverse shaft driven from said motor shaft, driving means between the transverse shaft and the plow shaft, the arrangement being such that the plow shaft is driven at a constant speed from the motor, driving means for the frame embodying a change speed transmission, the arrangement being such that the plow speed is at all times greater than the frame speed, and means to raise and lower the plow shaft embodying a transverse shaft, means to drive said transverse shaft in either direction from said first mentioned transverse shaft, a pair of vertical screws connecting at their lower ends with the plow shaft bearings, rotary means coöperating with said screws to raise and lower the plow shaft, and connective means between said rotary means and said second mentioned transverse shaft.

In witness that I claim the foregoing I have hereunto subscribed my name this 3rd day of February, 1916.

ANDREW J. AUTRY.

Witnesses:
ANDREW J. COHMERAUER,
ELWOOD H. BARKELEW.